June 16, 1964 A. H. ROSENTHAL 3,137,077
DRILL-HOLE DIRECTION INDICATOR
Filed May 21, 1958
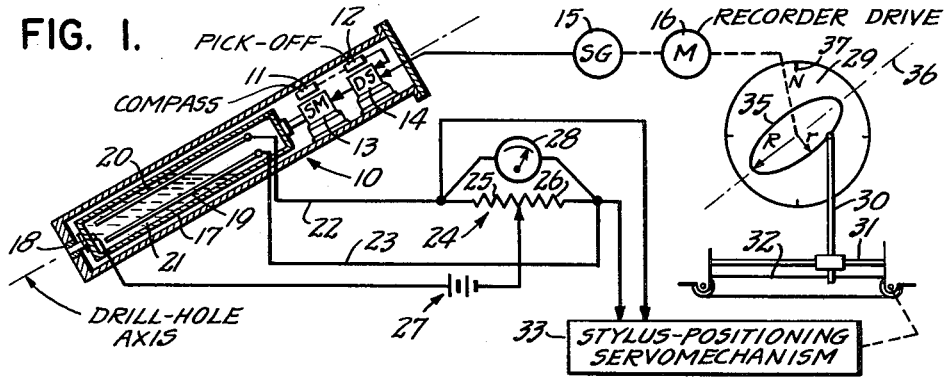
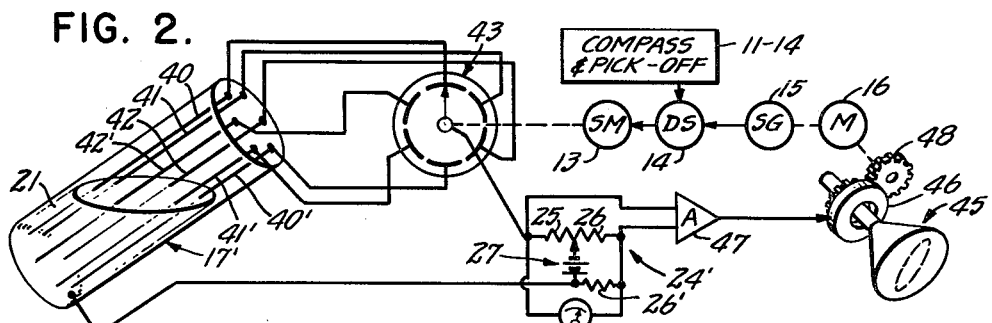
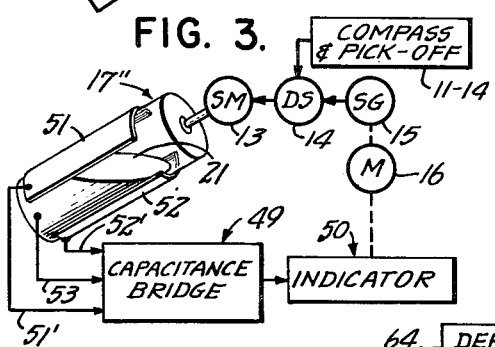
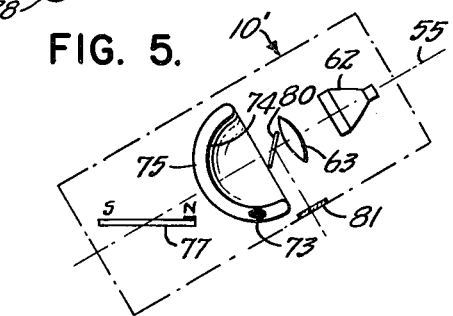
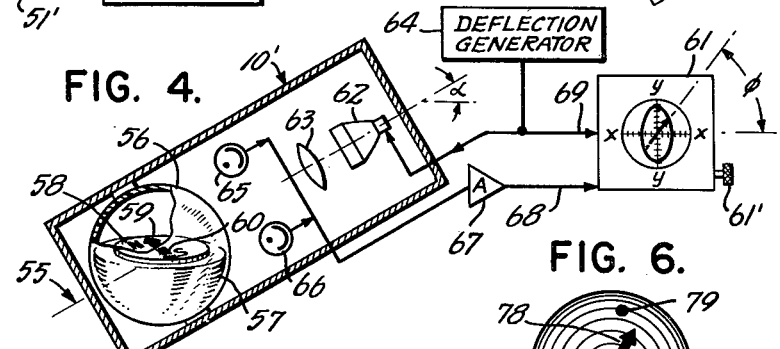
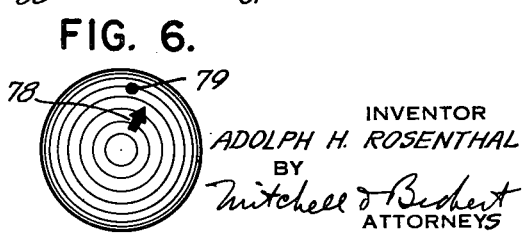
INVENTOR
ADOLPH H. ROSENTHAL
BY
Mitchell & Bechert
ATTORNEYS

United States Patent Office 3,137,077
Patented June 16, 1964

3,137,077
DRILL-HOLE DIRECTION INDICATOR
Adolph H. Rosenthal, 71—19 Ingram St., Forest Hills, N.Y.
Filed May 21, 1958, Ser. No. 736,901
3 Claims. (Cl. 33—205)

This invention relates to improved means for continuously observing or recording the instantaneous orientation of a drill hole as, for example, an oil-well drill hole.

In drilling holes for exploration and extraction of oil, natural gas, and in other mining problems, great difficulties are encountered when the drill is deflected from its original direction. Deflection may be intentional or unintentional, but for deep-drilling operations, it is most important that the exact amount of such deflection, and the exact location of the drill hole, particularly the drill bit, be known. For example, when drilling along an incline from a shore location or from a location close to the shore and in a direction away from the shore, it is necessary to know the position of the drill at all times, as, for example, in order to determine exactly when a secondary drilling is to be commenced in a vertical direction. Previous attempts to solve this problem have been subject to substantial error and have been unable to provide a quick and continuous remote indication at the surface of the location of the drill bit with respect to the base of operation at the surface.

It is, accordingly, an object of the invention to provide improved apparatus of the character indicated.

It is another object to provide an inherently simple and accurate method and means for continuously reporting the instantaneous inclination and azimuth direction of a drill hole.

It is an object to meet the above objects with a device which is very rugged and which may, if desired, be carried in a drill bit so that direction may be known as the drilling operation is proceeding.

Other objects and various further features of novelty and invention will be pointed out, or will occur to those skilled in the art, from a reading of the following specification in conjunction with the accompanying drawings. In said drawings, which show, for illustrative purposes only, preferred forms of the invention:

FIG. 1 is a simplified diagram schematically showing components of a complete drill-hole direction indicator of the invention;

FIG. 2 is a view similar to FIG. 1 but illustrating a modification;

FIG. 3 is another similar view illustrating a further modification;

FIG. 4 illustrates a further modification, part of the apparatus being shown in perspective to illustrate functioning;

FIG. 5 is a simplified optical diagram illustrating still another modification; and FIG. 6 depicts a display achieved with the apparatus of FIG. 5.

Briefly stated, the invention contemplates first apparatus contained within a package which may be carried by a well-drilling bit. This apparatus includes gravity-operated vertical-reference means against which the inclination of the drill bit is measured and horizontal-reference means against which the azimuth angle of the drill bit is measured. Means contained within the drill-bit package continuously scans the reference means about the axis of the device (which is always positioned in accordance with the instantaneous alignment of the drill hole) for developing an electrical output signal indicating deviation of the package axis from the vertical (i.e. determining its inclination), and from the horizontal (i.e. determining its azimuth angle). At the remote location, which may be at the location of starting the drilling operation at the surface, display means follows the output of the scanning means and is synchronized with the scanning motion of the scanning means so as to yield a direct display not only of the inclination of the drill-bit axis relatively to the true vertical, but also of the azimuth direction for which such inclination occurs. The distance from the surface location to the drill-bit location can always be known from the amount of pipe paid out, so that it is possible to develop continuous data as to the exact location of the drill bit with reference to the origin of the drilling operation.

Referring to FIG. 1 of the drawings, my invention is shown in application to a direction-sensing package 10, intended to be carried (inserted) within the drill pipe close to the drill bit or drill-bit adapter used for drilling an oil-well or the like hole. The drill bit is not shown, but the instantaneous axis of the hole developed by the drill bit is indicated by legend on the drawings. Preferably, said axis substantially coincides with, or at least is in parallel alignment with, the axis of the package 10. As indicated generally above, scanning means is carried in the package 10 for exploring the instantaneous orientation of the drill-hole axis with respect to an azimuth reference and with respect to true vertical. The azimuth reference may be developed from a compass schematically indicated at 11 and developing an electrical signal, referenced, say, to magnetic north at a pick-off element 12. The scanning means may be mechanically driven by a servomotor 13, and azimuth corrective signals may be developed in a differential synchro 14. In the form shown, basic servomotor drive signals are derived from a synchro generator 15 at the remote indicating or surface installation, said generator 15 being continuously driven by motor means 16 utilized in the display mechanism, as will be more clearly pointed out. Thus, the differential synchro 14 provides means whereby the servomotor 13 may always be driven in complete synchronism with the motor 16 at the surface, with proper correction for instantaneously detected north, as derived from the compass 11 and introduced as a corrective signal at the differential synchro 14 by means 12.

In the form shown, indication of any deviation from true vertical is established by employing a cylindrical chamber 17 mounted for axial rotation in the housing 10, as at the bearing 18, and which may be driven about its axis in accordance with rotation of motor 13. The chamber 17 is partially filled with a conductive liquid such as mercury, and two elongated electrical resistance elements 19—20 are carried within the chamber 17, e.g. at diametrically opposite locations symmetrically positioned about the axis of rotation of chamber 17. The amount of liquid 21 within chamber 17 should be such as to partially overlap both elements 19—20 when the axis of housing 10 is vertically oriented. Generally speaking, if the elements 19—20 extend for substantially the length of the chamber 17, then the liquid 21 preferably substantially half-fills the chamber 17.

The elements 19—20 may be conductive wires or strips, but they should at least have an electrical resistance which is high compared to the resistance of leads 22—23 connecting these elements to suitable signal-processing circuitry. These resistors, which may be metallic or semiconducting, are connected to a bridge circuit, designated generally 24. Although the bridge circuit may be located at the surface site, it is preferable that it be contained within the package 10. In the form shown, the bridge 24 includes resistance elements 25—26, to the connecting point of which a D.-C. or A.-C. voltage source, as exemplified by a battery 27, is connected. The other pole of the source is connected to a suitable terminal having contact with the liquid 21 within the chamber 17. A meter 28 (located above ground) provides the indication of the instantaneous unbalance of the bridge and thereby of the instantaneous deviation of the drill axis from the true vertical position; it may be calibrated so as to indicate zero (or 90°) for the vertical position of the axis, and the degrees of any inclination from the vertical.

At the remote-indicating location, various forms of display may be employed, but in the form shown, a circular plot is developed on a chart recorder employing circular paper or the like 29 mounted for rotation by motor 16. The paper 29 may include suitable azimuth markings and, of course, means (not shown) are employed to reference one of these markings with the azimuth reference 11 contained within the housing 10. The recording element for developing a display on paper 29 may be a stylus carried at the end of an arm 30. The arm 30 is shown guided by means of an elongated rail 31 for strictly radial movement with respect to the display means 29, and the means for radially positioning the arm 30 is shown to include an endless belt or tape 32 driven by stylus-positioning mechanism 33 directionally responsive to the instantaneous output of the bridge 24.

The plot 35 on the paper 29 is illustrative for the situation in which the drill-hole axis is inclined from the vertical. The radius R, representing the maximum excursion of the display 35, defines an axis 36 having a given inclination to the north (or basic azimuth reference) mark 37 in the display chart 29. This gives the instantaneous heading of the drill-hole axis, and the magnitude R is a direct indication of the slope of the drill-hole axis. Depending upon the calibration of the device, the radius R may directly indicate the slope, or it may be necessary to evaluate the proportion of the major axis R to the minor axis r of the display ellipse 35 in order to determine the instantaneous slope of the drill-hole axis. In any case, as indicated above, slope may be directly read from meter 28, suitably calibrated.

Instead of using fixed resistors 25—26, these bridge elements may consist of a slide wire or potentiometer with variable tap. In that event, depending upon the relative values of the conductors 19—20, the bridge will be in balance (in which case, the meter acts as null indicator) for any given axis inclination, if the tap position is properly adjusted; and the tap position will be an indication for the inclination. A special case would be if the conductors 19—20 are identical; then, a vertical position of the axis would balance the bridge for a position of the tap at the center of the slide wire. However, inequality may be desirable in some cases, providing a more convenient calibration.

If the chamber 17 is fixed relative to the drill, it will participate in the axial rotation of the drill pipe. Therefore, during drilling, the bridge unbalance will periodically change with this rotation, causing, in the case of fixed resistors 25—26, a periodic fluctuation of the indication of meter 28, or in the case of the slide wire, this will have to be continuously adjusted to maintain null indication of the meter 28. This can of course be done automatically, e.g. by controlling the tap position of the slide wire or potentiometer in a well known manner by a servo motor controlled by the null indicator.

In any case, the maximum amount of the unbalance will be indicative of the inclination to true vertical.

An alternative and preferable method (in the event of a chamber 17 that is not continuously rotated) would be to stop the drilling, and adjust the position of the chamber 17 such that the two conductors 19—20 lie in a vertical plane, in which case maximum unbalance will occur. This positional adjustment can be easily obtained by rotating the chamber 17 in bearing 18 by a motor 13 controllable from above ground, either manually or automatically, until maximum unbalance is obtained, either as indicated by the meter reading or by the slide wire or tap position; in FIG. 1, the synchro generator 15 will be understood to be sufficiently suggestive of means which can be manually controlled in order to develop desired rotation (including partial rotation) of the chamber 17.

In the arrangement of FIG. 2, certain of the parts correspond to those of FIG. 1 and have therefore been given the same reference numerals. The difference between FIG. 1 and FIG. 2 is that the chamber 17' of FIG. 2 is not rotated with respect to the package 10 at the drill-bit location, but is fixedly carried within package 10. The chamber 17' within package 10 is still preferably cylindrical and oriented as described in connection with FIG. 1. However, the chamber 17' now contains more than the two conductors (19—20) of FIG. 1, e.g. the six resistance elements shown, viz.: 40—41—42—40'—41'—42'. All of these conductors or elements are immersed in a conductive liquid 21, such as mercury. The scanning device may include a switch (or commutator) 43 having contact segments corresponding in number to the resistance elements 40—41—42—40'—41'—42', and connected thereto. Scanning is effected by means of a contact arm driven by the motor 13 and serving to connect consecutively each of the resistance elements to a measuring or indicating circuit. For instance, at any time one of the elements may form one arm of a bridge circuit 24' and thereby (in unbalance with the fixed opposite bridge arm 26') determine a meter indication (at 28) indicative of the resistance, and thereby degree of immersion (in the liquid 21) of the particular element. The two elements exactly or nearly in a vertical plane will respectively show maximum and minimum resistance, and the amount of the maximum or minimum may be used directly as a measure for the inclination. If the switch 43 is arranged at the surface, preferably close to the meter 28, it can be quickly manually operated to a position where the meter shows maximum (or minimum).

Instead of the meter 28, the display may employ a cathode-ray tube 45 having a rotatable deflection yoke 46 supplied with radial-deflection signals from an amplifier 47 responsive to instantaneous balanced or unbalanced conditions (of the bridge), as the case may be. Synchronism in the display is achieved by direct mechanical connection of the motor 16 to the yoke 46, as by gearing 48.

The display is seen to yield generally the same elliptical presentation as developed at 35 in FIG. 1, the essential difference being that, of course, separate arcuate markings will be developed for each commutator segment scanned, so that the ellipse will not be continuously developed as in FIG. 1. Nevertheless, the major and minor axes of the display can be readily evaluated in the manner discussed in connection with FIG. 1. By using a cathode ray tube with a multiplicity of deflection systems, e.g. three, a similar display may be achieved by connecting each of the deflection systems to one of the resistance elements 40—41—42—40'—41'—42' successively by a double-wiper switch (43). By connecting permanently each of the deflection systems to one of the resistance elements, the cathode ray spot will assume a resultant position from which the inclination angle can be determined by proper calibration. By using a multi-gun cathode ray tube and again permanently connecting the deflection elements with the resistance elements, a continuous display of the whole ellipse can be obtained.

The general advantage of the embodiment of FIG. 2 over that of FIG. 1 is that it enables a determination of the inclination without the necessity of rotating the chamber 17' to assure that the two wires (of FIG. 1) lie in a vertical plane. Here, there will always be one (or at the most two) of the wires at the highest (or lowest) position. Even if the position of the chamber is so that no one of the wires is exactly in the highest or lowest position, the position of the two wires nearest to such an extreme position can be utilized (by proper previous calibration) to indicate the exact inclination (by interpolation).

In both FIGS. 1 and 2, the resistance elements 19—20 (or 40—41—42—40'—41'—42') may be made of material having a high temperature coefficient of conductivity, such as used for bolometers or thermistors. In this case, the determination of the resistance, as implied in the present inclination measurements, may provide additional information as to the temperature of the geological layer at the instantaneous drill position. This is preferably done after allowing some time for cooling-off of any heat created by the drilling operation.

In the arrangement of FIG. 3, the principle is essentially the same as that of FIG. 1, except that capacitative elements are relied upon to sense instantaneous inclination of the axis of the chamber 17", said chamber 17" being oriented and rotated in the manner discussed in connection with FIG. 1, it being understood that further and narrower capacitative elements would provide the capacitative analog of FIG. 2. Corresponding parts are shown by the same reference numerals, and a capacitance bridge and the indicator are merely schematically indicated at 49—50, respectively; as an alternative, frequency modulation of an electric oscillating circuit (of which the capacitative elements form part) may be used. The capacitative elements are defined by electrode members 51—52 applied to opposite outer surface portions of the chamber 17". Of course, the chamber 17" must be of a dielectric material, such as glass, and the electrodes 51—52 may merely be metal foil, suitably cemented to the chamber 17"; alternatively, metal layers may be deposited on chamber 17", chemically, by sputtering, or by evaporation. The electrodes 51—52 should be elongated with respect to the amount of conductive liquid 21 within the chamber 17", such that in the vertically oriented position there is only a partial overlap of the electrodes 51—52 by the liquid 21, and for this condition the overlap may be the same. Bridge connections are established by leads 52'—51' to the two electrodes and by a center connection 53 to the liquid 21; as indicated above, more than two capacitative electrodes spaced around the axis of chamber 17" will provide the capacitative analog of FIG. 2, with similar advantages. Inclination indication may utilize the means described above with reference to FIG. 1 or FIG. 2.

Instead of spacing the capacitive layers on the outside of chamber 17 along a circular periphery thereof, these layers may also be axially spaced, and consist of two or more annular metal layers. Any inclination will then increase the capacity between the liquid and the upper annular electrodes, and decrease the capacitance between the liquid and the lower electrodes. These changes can be utilized in proper circuitry (which can be devised in various ways by anybody skilled in the art of circuitry technique) to determine the inclination.

The arrangement of FIG. 4 differs from the preceding embodiments in that scanning develops a direct display of the combined inclination and azimuth indications. The apparatus may again be contained within a housing 10' oriented with its longitudinal axis 55 parallel to the local drill-hole axis. At a lower part of the chamber of the housing 10' is a transparent chamber 56 which may be a sphere of suitable transparent plastic, such as Lucite or the like, partially filled (e.g. half-filled) with a liquid 57, such as mercury. A compass is provided, preferably in the form of a magnetic float element 58 which rides on the surface of the liquid 57 and may be shaped for self-centering retention by the wall of chamber 56. Float 58 may consist of a non-magnetic disc (e.g. of plastic) marked with circular angle calibration marks, into which is inserted a magnetized steel (e.g. Alnico) needle, bar, or rod. The disc is also clearly marked, as with a diametrically extending stripe 59 (which may be the magnet needle) to indicate, for example, north-south alignment; an asymmetrical marking of the stripe 59, in the form of an arrow or as by providing a discontinuity or space 60 therein, permits unambiguous interpretation of the north direction.

A closed-circuit television system continuously observes the compass float 58, and displays its image as seen in an axial direction, as at a display panel 61. The television pick-up scanner may be a cathode-ray tube 62 fixedly mounted within the housing 10' and preferably on the axis 55 thereof. A lens 63 images the phosphor screen of tube 62 on the float 58. Deflection voltages generated by suitable sweep-signal generating circuitry 64 (preferably above ground) are connected by cable to the beam-deflection means of cathode-ray tube 62 to scan the cathode-ray beam over the tube face in Cartesian or polar coordinates; also, a spiral scan may be used. Thus, tube 62 acts as a so-called flying-spot scanner, to scan the compass by an unmodulated light spot. One or more photo-cells 65—66 are exposed to the instantaneous light reflected off the float 58 due to the flying-spot scanning action and modulated in accordance with the varying local reflectivity. This modulation results in a video signal from the phototubes which may be amplified at 67 and supplied in line 68 to intensity-modulate a cathode-ray tube, the screen 61 of which represents the display, the latter being synchronized in its scan with the flying spot cathode-ray tube 62 by being supplied from the same deflection-signal generator 64.

In the display screen 61, and for any inclination of axis 55 from vertical, the circular mark or shape of compass float 58 generally shows as an ellipse, with its short axis indicating the plane containing the axis 55 and the vertical; to simplify read-out operations, manual adjustment means 61' at the display may be employed to angularly rotate, for example, the deflection yoke and thereby the ellipse in the display until the major and minor axes thereof coincide with fixed $x$—$y$ axes of the display. The length ratio of the minor ($x$) axis to the major ($y$) axis (which may be read against calibration markings on the display face) determines the inclination angle $\alpha$, as follows:

$$\sin \alpha = x/y$$

The angle $\phi$ shown on the display and also readable on an angular overlay scale thereof (not shown), between the compass north direction marking of stripe 59 and the minor ($x$) axis, determines the azimuth angle $\beta$ of the drill, as follows:

$$\tan \beta = \tan \phi \cdot \sin \alpha = \tan \phi \cdot x/y \qquad (1)$$

Instead of using a flying spot scanning tube 62 in combination with one or more phototubes 65—66, the pick-up system may consist of a standard type television camera pick-up tube, such as a Vidicon, Image-Dissector tube, or the like, in combination with one or more small lamps to illuminate the compass disc 58. Thus, in FIG. 4, 62 now would designate the Vidicon or the like, and 65—66 the one or more lamps. The lamps then illuminate the compass face, which is imaged by lens 63 onto the photosensitive signal plate of the Vidicon or the like. The video signals originate then from the Vidicon or the like output. Again, the deflections of the Vidicon or the like are synchronized with those of the display cathode-ray tube with screen 61.

The scan can be of a rather low definition, representing perhaps 100 to 200 parallel (if Cartesian) or radial (if polar) lines, with as many elements per line. Since also the scanning of one image may occupy the time of some seconds, for example, ten seconds, the video signal will have a narrow frequency bandwidth and can be transmitted from the drill location to the surface over simple telephone type lines. Such lines can also accommodate the deflection signals. In the case of such slow-scan narrow-band television operation, it is advisable to utilize as the display cathode-ray tube with the screen 61 one with a so-called storage screen, e.g. a phosphor screen which holds its luminosity over a time of ten or more seconds; such screens are known from radar indicators and one well-known type uses a P-7 phosphor.

In the arrangement of FIGS. 5 and 6, basically the same method is depicted as in FIG. 4, except that instead of a magnetic float on a pool (used in part to develop the vertical reference), a small drop of liquid, such as mercury 73, is positioned between two concentric shells 74—75 of transparent material, such as glass. The shells 74—75 may be hemispherical and define walls of a single closed vessel fixedly oriented within the housing 10' and preferably symmetrically with respect to the axis 55 thereof. Since the shells 74—75 are transparent, it is possible to mount a suitable compass indicator 77 on the remote side, that is, on the side remote from the scanning tube 62 and optical system 63. The compass 77 will be understood to be suitably supported as, for example, in a gimbal system or float-suspended (as for the case of the compass 59 of FIG. 4). Lamps or photocells and other elements of the closed-circuit television system may be as described for FIG. 4 and are therefore not shown in FIG. 5.

FIG. 6 depicts the type of display achieved with the arrangement of FIG. 5 in which a compass (north) indication is directly observed at 78, and the level indication (or deviation from the level) is displayed by the spot 79. Concentric circles inscribed on the shell 74 and, if desired, calibrated in angular units will show up in the display as reference marks, permitting easy direct reading of the extent of inclination or deviation $\alpha$ from the vertical, as will be understood. The apparent azimuth angle $\phi$ between the north indication 78 and the spot 79 maybe read from radial calibration lines (not shown), and the true azimuth angle $\beta$ obtained from $\phi$ and $\alpha$, by using Equation 1 above.

Alternatively to using the mercury drop 73 between the concentric downward turned half-spheres, upward turned concentric half-spheres filled with a transparent liquid (water or alcohol) and containing an air bubble, which will adjust itself to the highest position, can be used.

Frequently, it should be preferable instead of giving to the half-shells a true spherical shape, to shape them so that their curvature increases towards the outside, thus providing a higher inclination sensitivity at small angles.

In the devices according to FIGS. 4 and 5, in particular, the closed-circuit television pick-up system utilized for observing the inclination and azimuth indicators, can also be utilized by a simple modification to observe the inside walls of the bore hole; to this end, the wall of chamber 10' is provided with a transparent window portion, e.g. in FIG. 4, between the photo tubes 65, 66 and the compass 58, or in FIG. 5 between lens 63 and shell structure 74. In FIG. 5, this is provided by a removable (or semi-transparent) mirror 80 oriented 45° toward the axis and aligned with window 81. Mirror 80 sends an image of the bore-hole wall to the pick-up tube, the image being formed by lens 63. The mirror 80 may be movably supported within housing 10' by means not shown but remotely actuable to the position shown, as by solenoid control, it being understood that in the unactuated position mirror 80 is out of the field scanned by tube 62. Thus, when desired, the solenoid can be remotely actuated to place mirror 80 in the position shown, to permit direct observation of the bore-hole wall, in selective alternation with the direction and inclination survey.

It will be seen that an improved direction-sensing device has been described, particularly adapted to the reporting of instantaneous data on well-drill orientation. The device is inherently simple and accurate and may be made rugged and reliable (e.g. as a completely sealed unit), so that it may be carried in a drill bit to report drill orientation, continuously or at a desired instant. In the closed-circuit television system embodiments electric cable requirements may be minimized by utilizing transistor circuitry in the scanner and by employing a battery power supply carried by housing 10'. By coordinating instantaneous remote-direction data with known cable pay-out, the exact location of the drill bit, as well as the complete course of the drill hole may at all times be known. All the described operations may be made manually, or various degrees of automation may be introduced. Final data of inclination, azimuth and exact-location coordinate values may be fully evaluated and indicated or recorded by means of suitable computers and recorders, well known per se.

While the invention has been described in detail for the preferred forms shown, it will be understood that modifications may be made within the scope of the invention as defined in the claims which follow.

What is claimed is:

1. Drill-hole direction indicator means, comprising first apparatus including a chassis adapted to be lowered into a drill hole and to assume an orientation in accordance with the local alignment of the drill hole, and second apparatus comprising remote indicator display means electrically connected to said first apparatus, said first apparatus comprising an at least partially transparent chamber carried by said chassis and partially filled with a liquid and including a circularly marked float element supporting a compass magnet whereby the angular direction of said float element is determined by earth's magnetic north and the orientation of said float element may always be horizontal, an angle-identifying mark on said float element, and a closed-circuit television system including a scanning apparatus fixedly carried by said chassis and scanning said float, the scanning aspect of said scanning apparatus being parallel to that part of said chassis which follows the local alignment of the drill hole, said remote indicator display means being connected to said scanning apparatus whereby said circularly marked float will appear elliptically marked in the display for inclination of said chassis from the vertical, the degree of inclination being observable from the ratio of major to minor axes, and the direction of inclination being related to the angle between said mark and an axis of the ellipse, said display means including adjustable rotatable means for rotating the display of said ellipse and mark with respect to said second apparatus, whereby the instantaneous north-related direction of tilt may be readily evaluated.

2. Drill-hole direction indicator means, comprising a probe including a housing adapted to be lowered into a drill hole and having an elongation axis to assume an orientation in accordance with the local alignment of the drill hole, said probe including a circular compass element and support means including an enclosure for said compass element for supporting said compass element in a horizontal plane, said compass element having north-indicating means on a viewable side thereof, said enclosure being transparent on said viewable side, and a closed-circuit television system including scanning apparatus fixed within said housing and aligned to scan the viewable side of said compass through said enclosure and on an axis parallel to said elongation axis, whereby for various angles of tilt the compass circle will be elliptically projected for scan by said scanning apparatus, said television system including remote-display means, whereby the scanned compass circle will be displayed as an ellipse, so that displayed orientation of major and minor ellipse axes is an exact indication of instantaneous direction of tilt of said elongation axis, said remote-display means including means referencing one of said major and minor axes to north, whereby the observed angular departure between said one axis and the display of said north-indicating means will correctly indicate the true instantaneous direction of tilt of the elongation axis of said probe, and said remote-display means including means for measuring magnitudes of said major and minor axes, whereby the observed relative magnitude of said major and minor axes will indicate instantaneous magnitude of tilt.

3. The method of continuously locally probing and remotely displaying the instantaneous direction and magnitude of tilt of a drill hole using a circular compass element and a closed-circuit television scanner and display system, which comprises supporting the television scanner and the compass element in spaced relation with the compass element in a horizontal plane and with the scanning axis directed at a viewable side of the compass element and parallel to the instantaneous drill hole direction, whereby for various angles of tilt of the drill hole direction with respect to the vertical the compass circle will be elliptically projected for scan by said scanning apparatus, mounting the display part of said system externally of the drill hole, whereby under tilt conditions the scanned compass circle will be displayed as an ellipse, so that the displayed orientation of major and minor ellipse axes is an exact indication of instantaneous direction of tilt of said instantaneous drill hole direction, referencing to north one of the displayed major and minor axes, whereby the observed angular departure between said one axis in terms of the north reference will correctly indicate the true instantaneous drill hole direction, and observing the relative magnitude of said major and minor axes, whereby instantaneous magnitude of the tilt of the drill hole direction is ascertained.

References Cited in the file of this patent

UNITED STATES PATENTS

| | | |
|---|---|---|
| 996,106 | Means | June 27, 1911 |
| 1,889,921 | Jakosky | Dec. 6, 1932 |
| 2,103,235 | Conrad | Dec. 28, 1937 |
| 2,167,072 | Hendrickson | July 25, 1939 |
| 2,169,342 | Hewitt et al. | Aug. 15, 1939 |
| 2,500,410 | Hewitt | Mar. 14, 1950 |
| 2,616,187 | Young | Nov. 4, 1952 |
| 2,640,271 | Boucher | June 2, 1953 |
| 2,812,697 | Laval | Nov. 12, 1957 |
| 2,851,785 | Gaudin | Sept. 16, 1958 |

FOREIGN PATENTS

| | | |
|---|---|---|
| 742,983 | Great Britain | Jan. 4, 1956 |